No. 733,748. PATENTED JULY 14, 1903.
F. W. RATHBUN.
SEWER GAS AND BACKWATER TRAP AND TIDE AND FLUSHING GATE.
APPLICATION FILED OCT. 28, 1902.
NO MODEL.

WITNESSES:
K. Lockwood Nevins
Bessie Gorfinkel

INVENTOR:
F. W. Rathbun
BY
Francis M. Wright.
ATTORNEY.

THE NORRIS PETERS CO., PHOTO-LITHO., WASHINGTON, D. C.

No. 733,748. Patented July 14, 1903.

UNITED STATES PATENT OFFICE.

FRANK W. RATHBUN, OF SAN FRANCISCO, CALIFORNIA, ASSIGNOR TO GEORGE C. DALLAMORE, OF SAN FRANCISCO, CALIFORNIA.

SEWER-GAS AND BACKWATER TRAP AND TIDE AND FLUSHING GATE.

SPECIFICATION forming part of Letters Patent No. 733,748, dated July 14, 1903.

Application filed October 28, 1902. Serial No. 129,068. (No model.)

*To all whom it may concern:*

Be it known that I, FRANK W. RATHBUN, a citizen of the United States, residing at San Francisco, in the county of San Francisco and State of California, have invented certain new and useful Improvements in Sewer-Gas and Backwater Traps and Tide and Flushing Gates, of which the following is a specification.

My invention relates to a sewer-gas and backwater trap and tide and flushing gate, the object of my invention being to provide a device of this character which can be adjusted in place and removed when desired with the greatest facility whatever be the depth below the surface of the ground of the sewer in which the trap is to be applied, in which there shall be no failure to operate through rust or for other causes, which can be readily adjusted both in regard to the valve-seat of the trap and also in regard to the valve for the same, and the valve or gate of which shall swing with a long leverage, so as to insure perfect operation notwithstanding greater opposing pressure.

A further object of the invention is to provide a device of this character which shall contain few parts and be simple in construction.

My invention therefore resides in the novel construction, combination, and arrangement of parts for the above ends hereinafter fully specified, and particularly pointed out in the claims.

Figure 1:
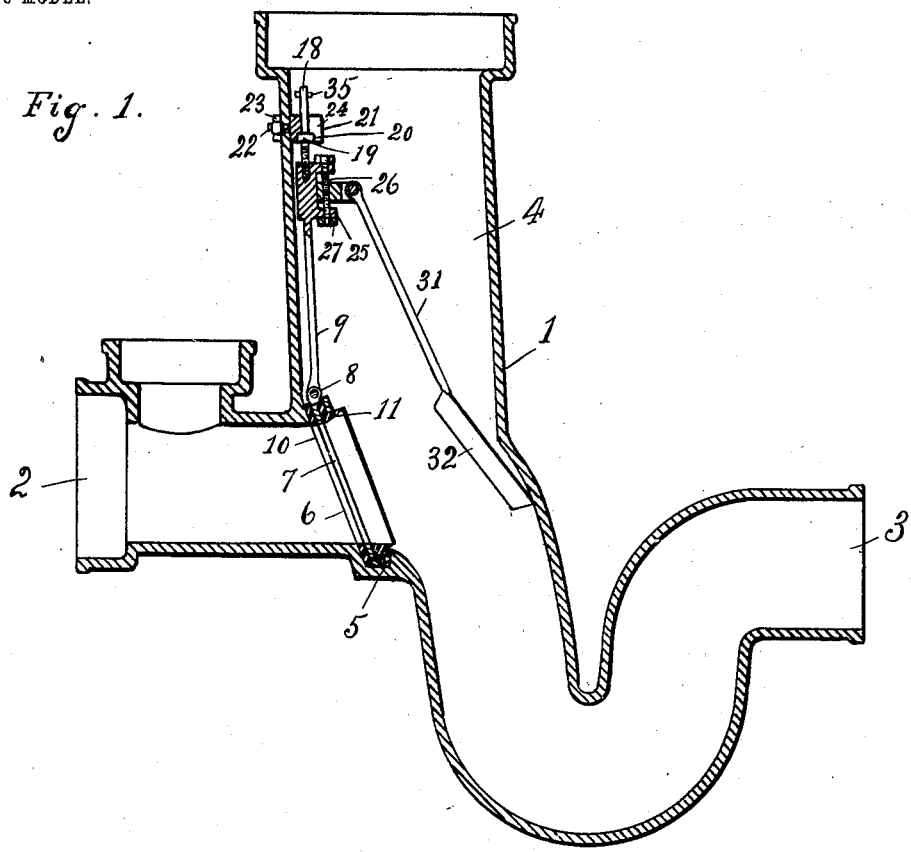
Figure 2:
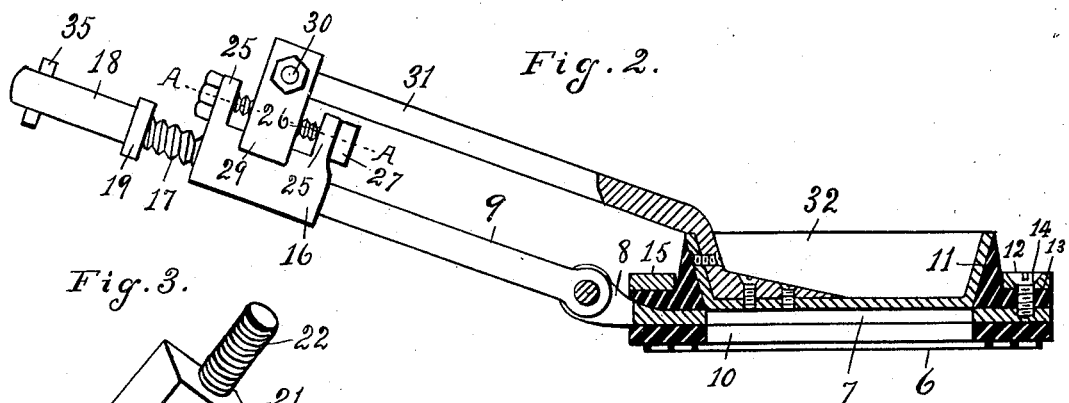
Figure 3:
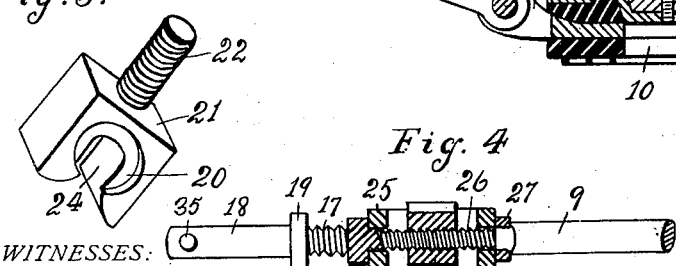
Figure 4:
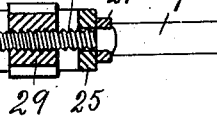

In the accompanying drawings, Figure 1 is a vertical section of the device. Fig. 2 is a side view, partly in section, of the frame and gate detached. Fig. 3 is a perspective view from the under side of the pressure-block. Fig. 4 is a section on the line A A of Fig. 2.

Referring to the drawings, 1 represents the trap, 2 representing the inlet-pipe and 3 representing the outlet-pipe therefor. Integral with said trap is formed a vertical chamber 4, in which chamber swings the valve-stem to close the sewer-pipe. At the inner end of the inlet-pipe is formed on its under side a groove 5, into which is let down the lower edge of a circular valve-seat 6. Said frame comprises a central metallic ring 7, having a lug 8, by means of which it is hinged to a hanger 9, a rubber ring 10, secured, as by cement, on the under side of said metallic ring, and a rubber bushing 11, secured by screws 12 to the upper side of said ring and having a flange 13, said screws being let into countersunk holes 14 in a ring 15, resting upon the top of the bushing 11. The hanger 9, to which the main ring 7 is hinged, has formed at the upper end thereof a head 16, in which is screwed the screw-threaded end 17 of a stem 18, having a collar 19. Said collar is adapted to be pressed into a recess 20 in a pressure-block 21, having formed thereon a screw 22, which is screwed through the side of the chamber 4 and is secured by a nut 23. The inner side of said block is split or forked, as shown at 24, to permit the stem 18 to be passed into said block. Upon the upper end said stem has formed or otherwise secured thereon pins 35, adapted to be grasped by a grip to turn the stem. Upon the inner side of the head 16 of the hanger 9 are formed lugs 25, through which passes a bolt 26, the lower end of which has mounted thereon a ring or washer 27, which is secured in place by the end of said bolt being swaged over, as shown in Fig. 4. Said bolt passes through a threaded aperture in a block 29, the outer end of which is forked to pass over the sides of the head 16, by which means the block is prevented from turning. By screwing or unscrewing the bolt it acts as a worm to raise or lower the block 29. To said block is pivoted, as shown at 30, a rod 31, to the lower end of which is secured a valve 32.

The apparatus is put into place in the following manner: The whole apparatus is lowered into the chamber 4 until the lower edge of the valve-seat rests in the groove 5. The upper edge of the valve-seat is shifted toward the inlet-pipe, and the stem 18 is passed through the slit 24 in the inner side of the block 21. The stem 18 is then unscrewed, and by reason of the collar 19 pressing against the recess 20 in the block the unscrewing of said stem has the effect of firmly pressing down the valve-seat into place. The valve will normally hang downward, so as to close the opening through the valve-seat, and its position can be accurately adjusted by turning the bolt or worm 26.

The side of the valve is made conical or converging in form, so as to fit snugly within the similarly-shaped inner side of the flange of the rubber bushing 11.

It will be seen that this construction provides a close fit against the escape of sewer-gas, and the device can be readily placed in position in the sewer. It can also be readily adjusted from the top both as to the valve-seat and the valve.

I claim—

1. In a device of the character described, the combination of the trap having the vertical chamber and a groove for the valve-seat, of the valve-seat, means for suspending the same from above, means for forcing said valve-seat firmly down into said groove, the valve for said seat, and means for suspending said valve from above to swing to and from said valve-seat, substantially as described.

2. In a device of the character described, the combination of the sewer-pipe having a receptacle for the valve-seat, a valve-seat therefor, a chamber connected with said sewer-pipe, a hanger for suspending said valve-seat in said chamber, means for forcing said hanger downward to press said valve-seat into place, and a valve swinging to and from said valve-seat, substantially as described.

3. In a device of the character described, the combination of a sewer-pipe having a place for a valve-seat, said valve-seat, a hanger therefor, a fixed block, a stem passing through said block and having a rotatable connection with said hanger, said stem having a shoulder abutting against the under side of the block and a valve swinging to and from said valve-seat to close the same, substantially as described.

4. In a device of the character described, the combination of a sewer-pipe having a place for a valve-seat, a valve-seat therefor, a hanger, means for forcing said hanger downwardly to press said valve-seat onto its place, a valve, a stem by which said valve is suspended, and a pivotal connection between the upper end of said stem and said hanger, substantially as described.

5. In a device of the character described, the combination of a sewer-pipe having a place for a valve-seat, a valve-seat therefor, a hanger, means for forcing said hanger downwardly to press said valve-seat onto its place, a valve, a stem by which said valve is suspended, and a pivotal and adjustable connection between the upper end of said stem and said hanger, substantially as described.

In witness whereof I have hereunto set my hand in the presence of two subscribing witnesses.

F. W. RATHBUN.

Witnesses:
FRANCIS M. WRIGHT,
BESSIE GORFINKEL.